(12) United States Patent
Dong et al.

(10) Patent No.: US 9,525,936 B1
(45) Date of Patent: Dec. 20, 2016

(54) WIRELESS EARBUD COMMUNICATIONS USING MAGNETIC INDUCTION

(71) Applicant: Google Inc., Mountain View, CA (US)

(72) Inventors: Jianchun Dong, Palo Alto, CA (US); Richard Herr, Mountain View, CA (US)

(73) Assignee: Google Inc., Mountain View, CA (US)

( * ) Notice: Subject to any disclaimer, the term of this patent is extended or adjusted under 35 U.S.C. 154(b) by 226 days.

(21) Appl. No.: 14/173,708

(22) Filed: Feb. 5, 2014

(51) Int. Cl.
*H04R 3/00* (2006.01)
*H04R 1/10* (2006.01)
*G02C 11/06* (2006.01)
*H04B 1/3827* (2015.01)
*G02C 5/14* (2006.01)
*H04B 5/00* (2006.01)
*H04B 5/02* (2006.01)

(52) U.S. Cl.
CPC ............. *H04R 3/00* (2013.01); *G02C 11/06* (2013.01); *H04B 1/385* (2013.01); *H04B 5/0075* (2013.01); *H04R 1/1058* (2013.01); *G02C 5/143* (2013.01); *H04B 5/00* (2013.01); *H04B 5/0006* (2013.01); *H04B 5/0081* (2013.01); *H04B 5/02* (2013.01)

(58) Field of Classification Search
CPC ....... H04R 1/10; H04R 1/1008; H04R 1/1016; H04R 1/105; H04R 1/1058; H04R 1/1066; H04R 1/1075; H04R 5/033; H04R 5/027; H04R 5/0335; H04R 2205/024; H04R 2201/103; H04R 2205/022; H04R 2420/07; H04R 25/604; H04R 25/552; H04R 25/606; H04R 2460/13; H04R 25/554; H04R 2225/021; H04R 2225/023; G02C 11/06; G02C 5/143; G02C 11/10; G02B 27/017; H04W 4/008; G10K 11/22

USPC ............... 381/358, 367, 370, 371, 374, 375, 380,381/327
See application file for complete search history.

(56) References Cited

U.S. PATENT DOCUMENTS

| | | | | |
|---|---|---|---|---|
| 3,125,646 A | * | 3/1964 | Lewis | G02C 11/06 381/326 |
| 5,420,930 A | * | 5/1995 | Shugart, III | H04R 25/456 381/315 |
| 6,208,740 B1 | * | 3/2001 | Grever | H04B 5/0006 381/79 |
| 6,424,820 B1 | * | 7/2002 | Burdick | H04B 5/0081 455/132 |

(Continued)

*Primary Examiner* — Davetta W Goins
*Assistant Examiner* — Oyesola C Ojo
(74) *Attorney, Agent, or Firm* — McDonnell Boehnen Hulbert & Berghoff LLP

(57) ABSTRACT

Disclosed are systems and devices for transmission of an audio signal. In some embodiments, the system may include a wearable computing device, a first audio receiver, and a second audio receiver. The wearable computing device may include an audio source configured to generate an audio signal that includes a first channel and a second channel, and a transmission coil configured to transmit the audio signal. The first audio receiver may include a first receiving coil configured to receive the audio signal, a first circuit configured to process the audio signal to determine the first channel, and a first audio output configured to output the first channel. Similarly, the second audio receiver may include a second receiving coil configured to receive the audio signal, a second circuit configured to process the audio signal to determine the second channel, and a second audio output configured to output the second channel.

9 Claims, 10 Drawing Sheets

(56) References Cited

U.S. PATENT DOCUMENTS

| | | | |
|---|---|---|---|
| 6,729,726 B2* | 5/2004 | Miller | G02C 11/10 |
| | | | 351/123 |
| 7,099,486 B2* | 8/2006 | Julstrom | H04R 25/43 |
| | | | 381/315 |
| 7,254,366 B2 | 8/2007 | Palermo et al. | |
| 7,278,734 B2* | 10/2007 | Jannard | G02C 3/003 |
| | | | 351/158 |
| 7,555,134 B2* | 6/2009 | Dunn | H04R 1/1016 |
| | | | 381/309 |
| 7,627,289 B2 | 12/2009 | Huddart | |
| 8,363,872 B2* | 1/2013 | Wiggins | H04R 25/554 |
| | | | 381/315 |
| 8,526,879 B2 | 9/2013 | Kristiansen et al. | |
| 8,693,720 B2* | 4/2014 | Parkins | H04R 1/1091 |
| | | | 381/315 |
| 9,264,824 B2* | 2/2016 | Pruthi | G06F 3/04842 |
| 2004/0136555 A1* | 7/2004 | Enzmann | H04R 25/43 |
| | | | 381/314 |
| 2007/0086600 A1* | 4/2007 | Boesen | H04R 5/033 |
| | | | 381/79 |
| 2009/0041241 A1 | 2/2009 | Dobyns et al. | |
| 2009/0207022 A1* | 8/2009 | Reckeweg | G06K 7/0008 |
| | | | 340/572.1 |
| 2010/0136905 A1* | 6/2010 | Kristiansen | H04B 5/0075 |
| | | | 455/41.1 |
| 2010/0296667 A1* | 11/2010 | Parkins | H04R 1/1091 |
| | | | 381/74 |
| 2013/0311176 A1* | 11/2013 | Brown | H04R 1/1091 |
| | | | 704/233 |

* cited by examiner

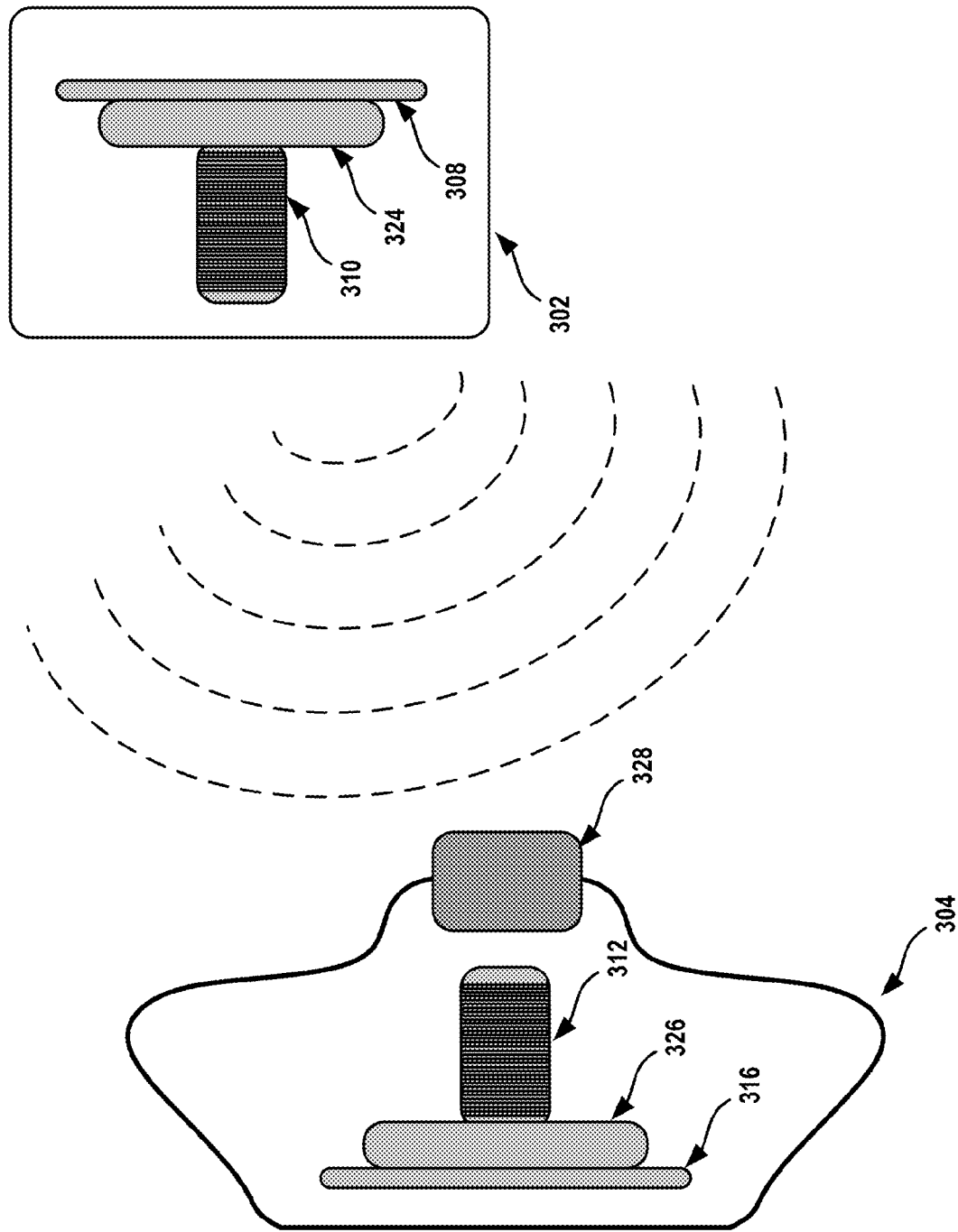

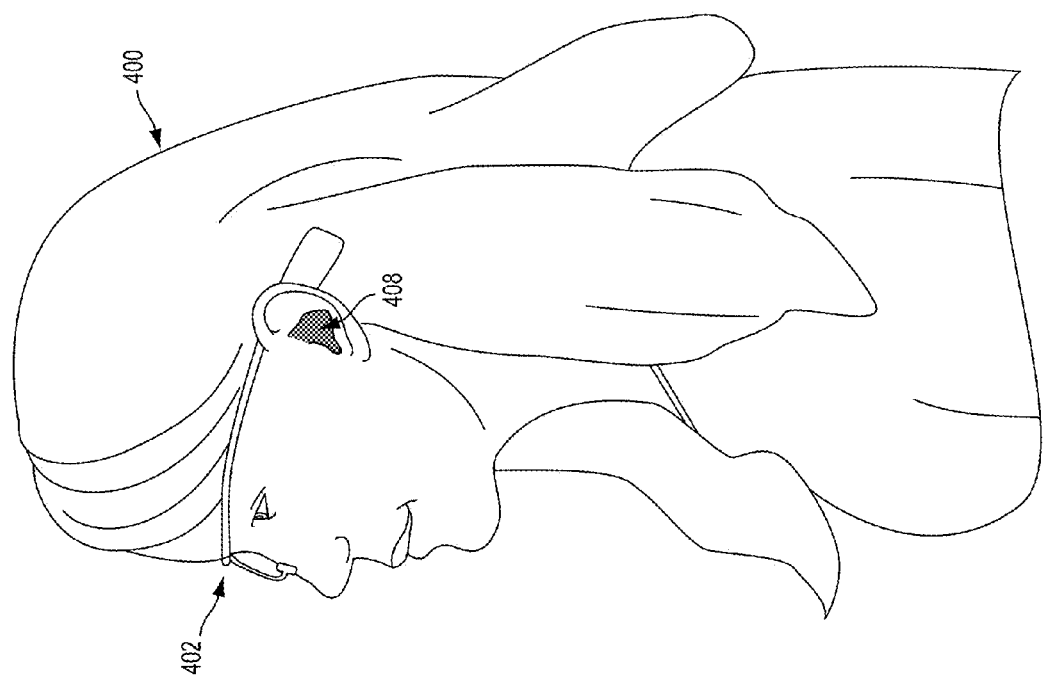
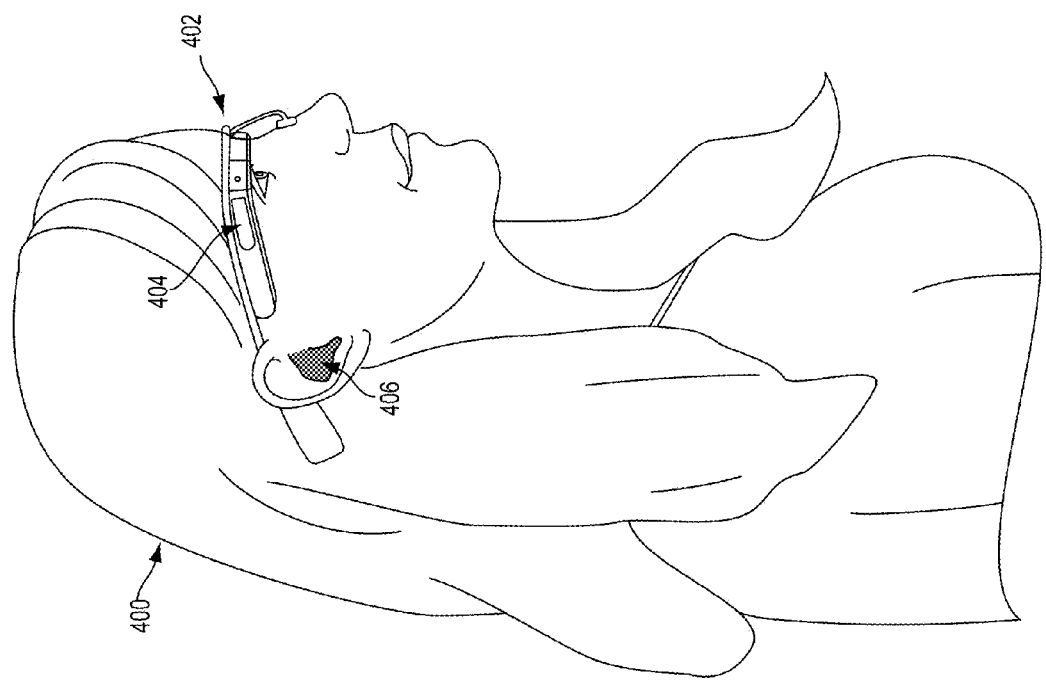

WIRELESS EARBUD COMMUNICATIONS USING MAGNETIC INDUCTION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of a wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

A wearable computing device may be configured with an audio source that is configured to generate an audio signal. The audio signal may be a high-fidelity signal, such as, for example, a stereo music signal. Other audio signals are possible as well. Accordingly, it may be desirable for the wearable computing device to be configured to transmit the audio signal to audio receivers, such as earbuds (e.g., in-ear or over-ear headphones) or other headphones. In this manner, a user of the wearable computing device may listen to the audio signal from the wearable computing device through the audio receivers.

It may be desirable for the audio receivers to be wirelessly coupled to the wearable computing device. To this end, the wearable computing device and the audio receivers could be compatible with, for example, Advanced Audio Distribution Profile (A2DP) Bluetooth technology. A2DP Bluetooth technology may allow the wearable computing device to transmit the audio signal to the audio receivers for output by the audio receivers. However, A2DP Bluetooth technology consumes about 20 mW/h of power, such that a wearable computing device using a 20 mAh lithium battery would be limited to transmitting approximately 4-5 hours of high-fidelity audio. Further, A2DP Bluetooth technology audio is transmitted using a 2.4 GHz radiofrequency (RF) signal. Because this signal can be strongly absorbed by the human head, transmitting a stereo (as opposed to mono) audio signal with A2DP Bluetooth technology can require a large amount of power.

Disclosed are audio receivers that are designed to receive high-fidelity audio from a wearable computing device using magnetic induction. In some examples, the disclosed audio receivers may allow for the lower-power transmission of a stereo audio signal and an improved battery life.

In one aspect, a system is disclosed that may include a wearable computing device, a first audio receiver, and a second audio receiver. The wearable computing device may include an audio source configured to generate an audio signal that includes a first channel and a second channel. The wearable computing device may further include a transmission coil configured to transmit the audio signal. The first audio receiver may include a first receiving coil configured to receive the audio signal, a first circuit configured to process the audio signal to determine the first channel, and a first audio output configured to output the first channel using the first receiving coil. Similarly, the second audio receiver may include a second receiving coil configured to receive the audio signal, a second circuit configured to process the audio signal to determine the second channel, and a second audio output configured to output the second channel using the second receiving coil.

In another aspect, a system is disclosed that may include a transmission coil, a first audio receiver, and a second audio receiver. The transmission coil may be configured to transmit an audio signal that includes a first channel and a second channel. The first audio receiver may include a first receiving coil configured to receive the audio signal, a first circuit configured to process the audio signal to determine the first channel, and a first audio output configured to output the first channel using the first receiving coil. Similarly, the second audio receiver may include a second receiving coil configured to receive the audio signal, a second circuit configured to process the audio signal to determine the second channel, and a second audio output configured to output the second channel using the second receiving coil.

In yet another aspect, an audio receiver is disclosed that may include a receiving coil, a circuit, and an audio output. The receiving coil may be configured to receive an audio signal using magnetic induction at a frequency in a range of about 50-200 MHz. The audio signal may include a first channel and a second channel. The circuit may be configured to process the audio signal to determine the first channel, and the audio output may be configured to output the first channel using the receiving coil.

In still another aspect, a system is disclosed that includes means for transmitting an audio signal, a first means for receiving the audio signal, and a second means for receiving the audio signal. The means for transmitting the audio signal may include an audio source configured to generate an audio signal that includes a first channel and a second channel. The means for transmitting the audio signal may further include a transmission coil configured to transmit the audio signal. The first means for receiving the audio signal may include a first receiving coil configured to receive the audio signal, a first circuit configured to process the audio signal to determine the first channel, and a first audio output configured to output the first channel using the first receiving coil.

Similarly, the second means for receiving the audio signal may include a second receiving coil configured to receive the audio signal, a second circuit configured to process the audio signal to determine the second channel, and a second audio output configured to output the second channel using the second receiving coil.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 3A to 3B are a simplified block diagram (3A) and a simplified illustration (3B) of a system including an audio transmitter, a first audio receiver, and a second audio receiver, according to an example embodiment.

FIGS. 4A-4B show simplified illustrations of right-side (4A) and left-side (4B) views of an example wearable computing system, being worn by a user, according to an example embodiment.

DETAILED DESCRIPTION

Figure 1A:
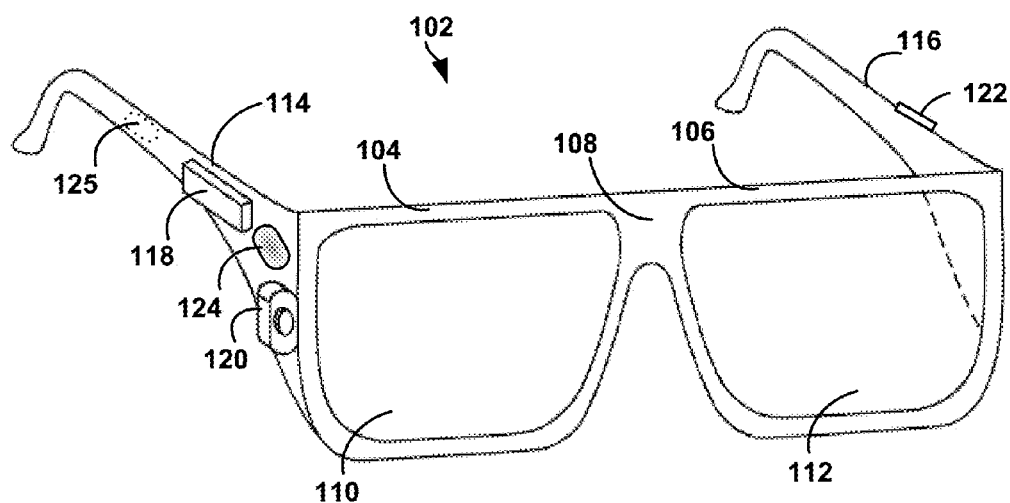
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A wearable computing device may include an audio source that is configured to generate an audio signal. The audio signal may include a first channel and a second channel. In some embodiments, the audio signal may be a high-fidelity audio signal, such as, for example, a stereo music signal. Other audio signals are possible as well.

The wearable computing device may also include a transmission coil that is configured to transmit to the audio signal. In particular, the wearable computing device may be configured to transmit the audio signal using magnetic induction. The audio signal may be transmitted by the transmission coil at a frequency of, for example, 50-200 MHz. Other frequencies are possible as well.

The wearable computing device may be coupled (e.g., wirelessly coupled) to a first audio receiver and a second audio receiver. The first audio receiver may include a first receiving coil configured to receive the audio signal from the transmission coil using magnetic induction. The first audio receiver may further include a first circuit configured to process the audio signal to determine the first channel, and a first audio output configured to output the first channel using the first receiving coil.

Similarly, the second audio receiver may include a second receiving coil configured to receive the audio signal from the transmission coil using magnetic induction. The second audio receiver may further include a second circuit configured to process the audio signal to determine the second channel, and a second audio output configured to output the second channel using the second receiving coil.

Because signals transmitted using magnetic induction drop off (i.e., reduce in strength) quickly (i.e., at a rate of approximately $1/r^6$, where r is a distance from the transmission coil), the disclosed wearable computing system may be used in close proximity to other similar systems without interference. Further, the audio signal transmitted at 50-200 MHz using magnetic induction may be substantially transparent to the human head. As a result, the transmission coil may transmit the audio signal using reduced power (e.g., as compared to the power used to transmit an audio signal in accordance with the A2DP Bluetooth protocol), thereby allowing for the transmission of a stereo audio signal while maintaining an improved battery life.

Example wearable computing systems and devices are described below.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
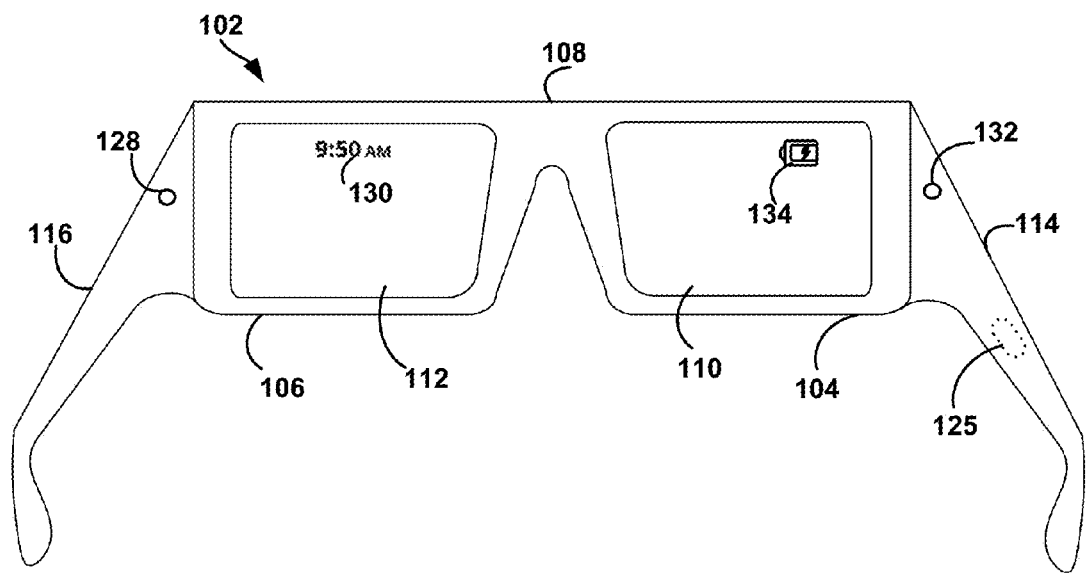
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
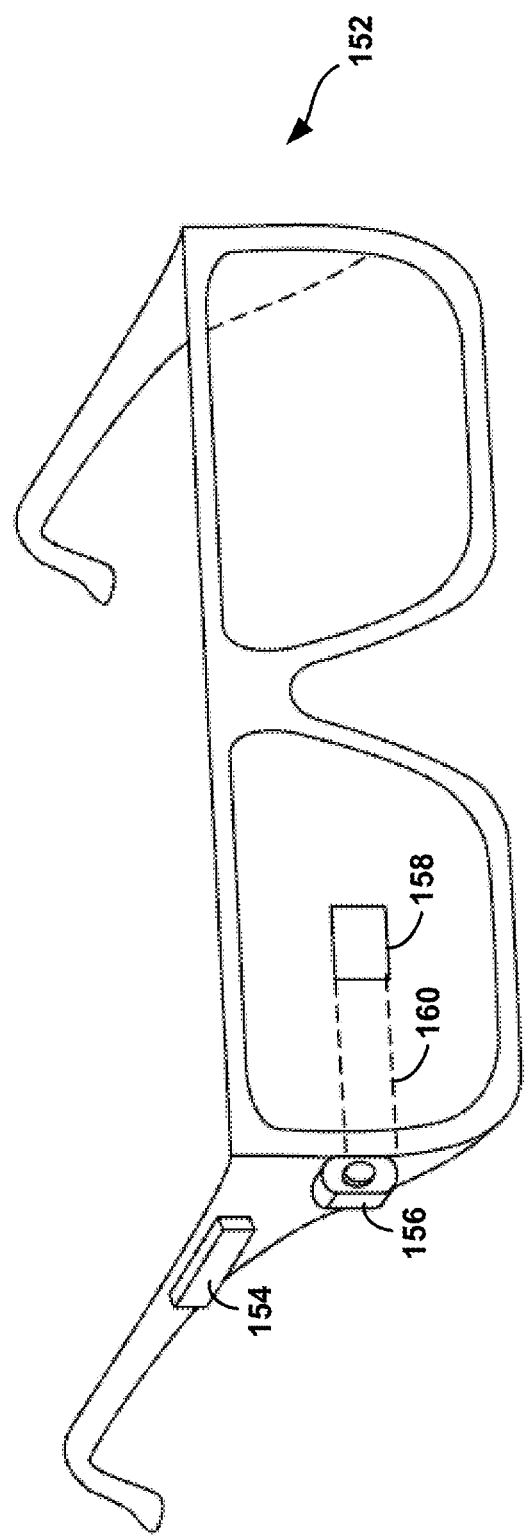
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
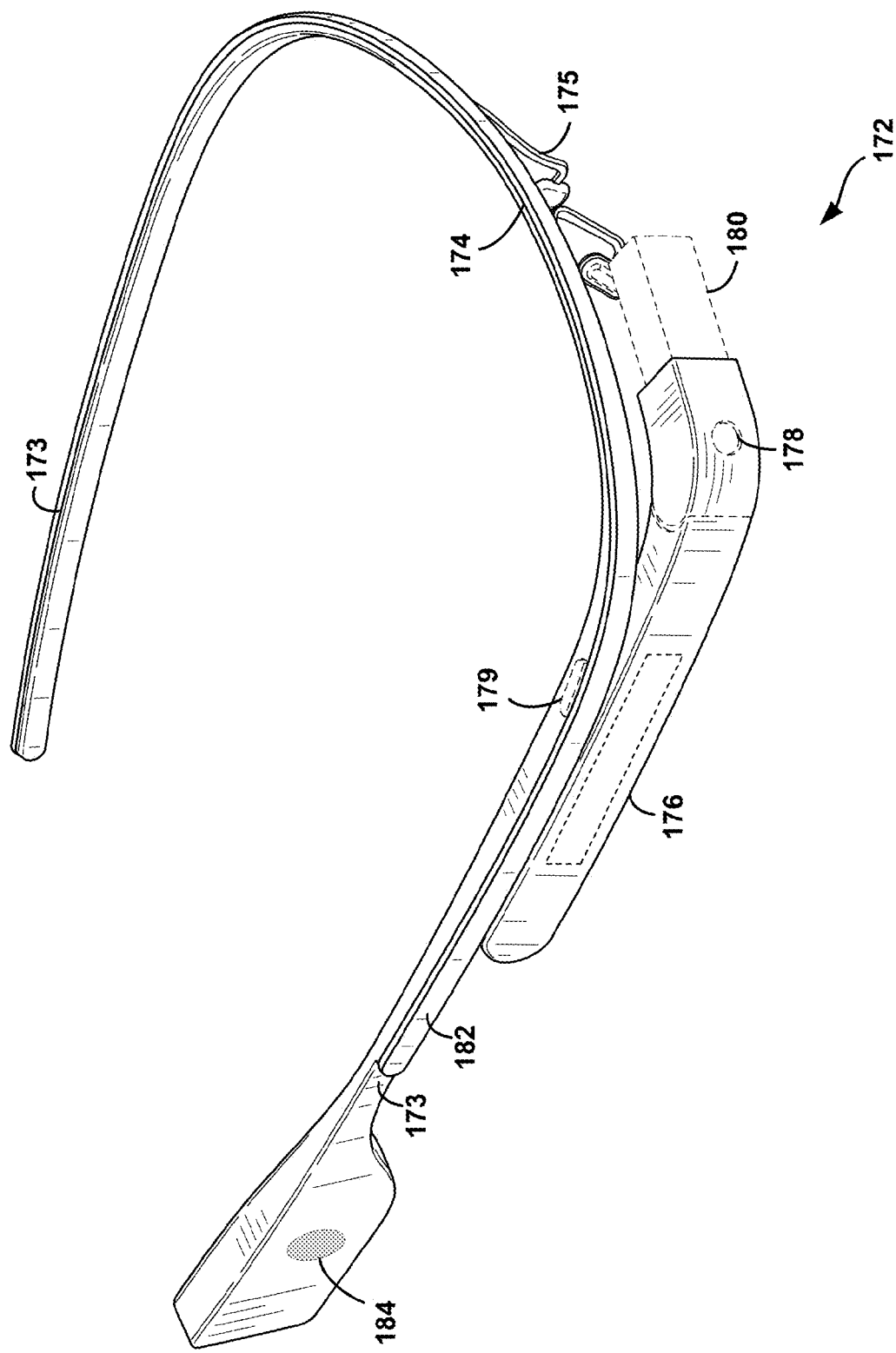
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 184.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 182, which may be used to adjust the length of the side-arms 173. Thus, sliding feature 182 may be used to adjust the fit of HMD 172. Further, an HMD may include other features that allow a wearer to adjust the fit of the HMD, without departing from the scope of the invention.

Figure 1E:
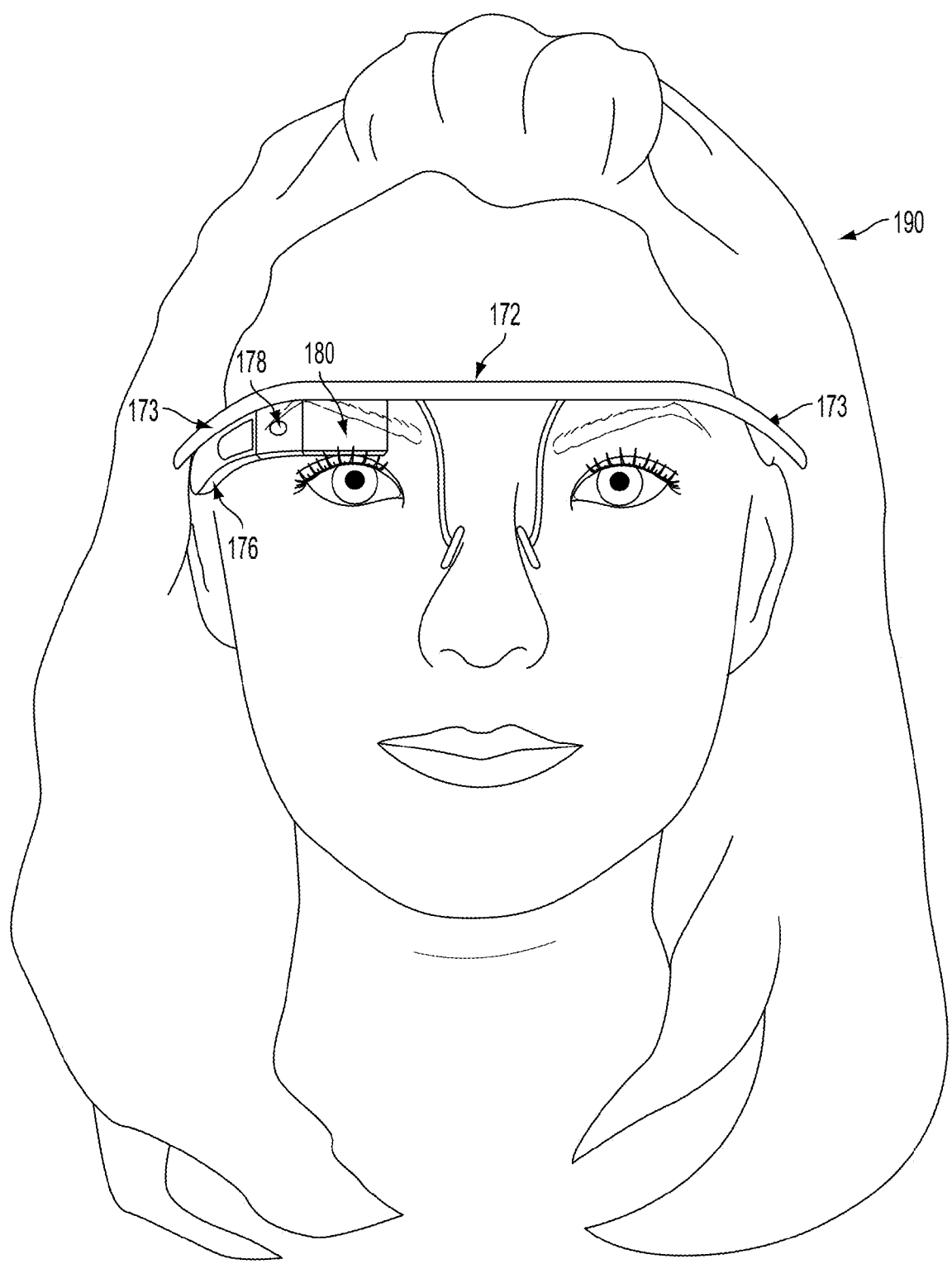
FIGS. 1E to 1G are simplified illustrations of the wearable computing system shown in FIG. 1D, being worn by a wearer.
Figure 1F:
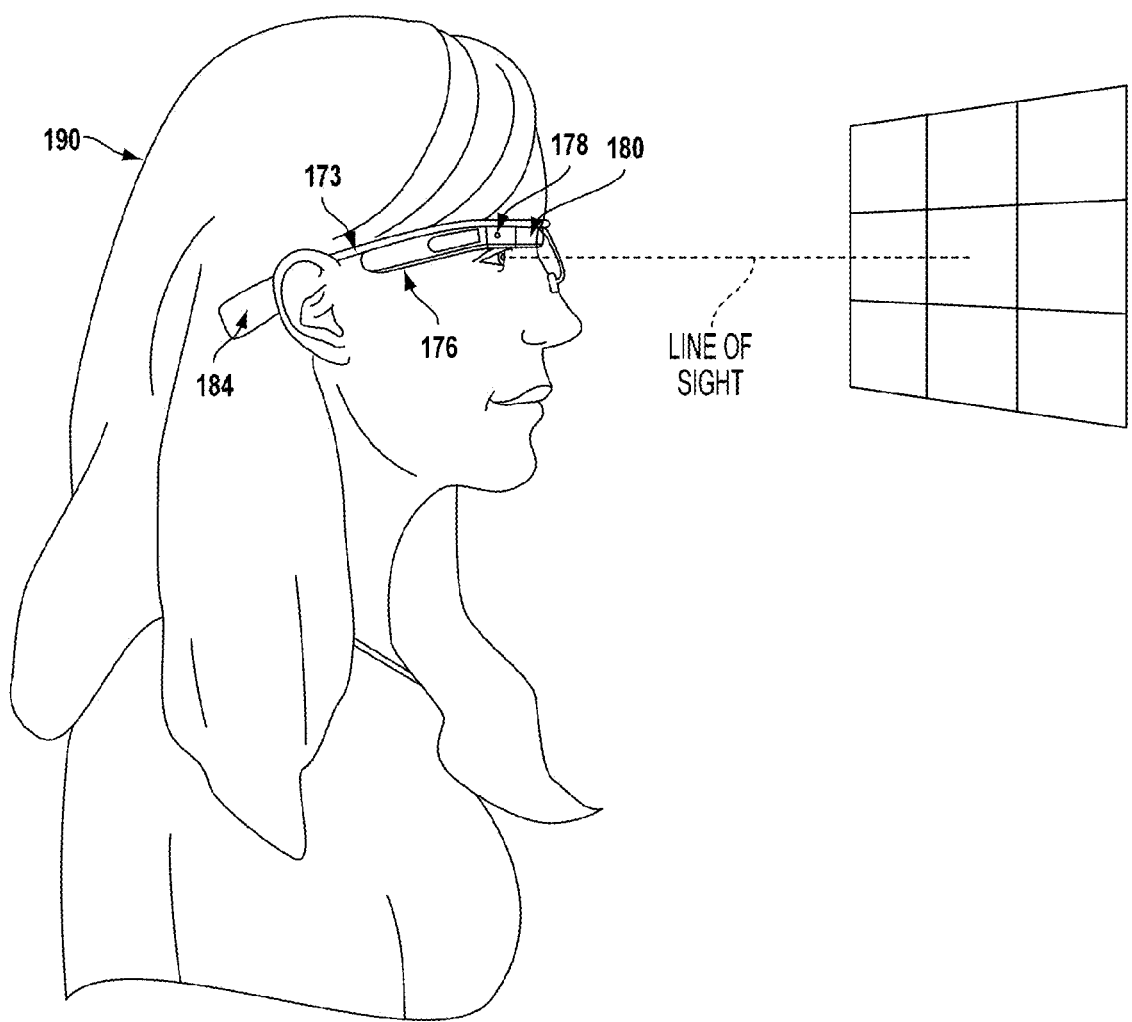
Figure 1G:
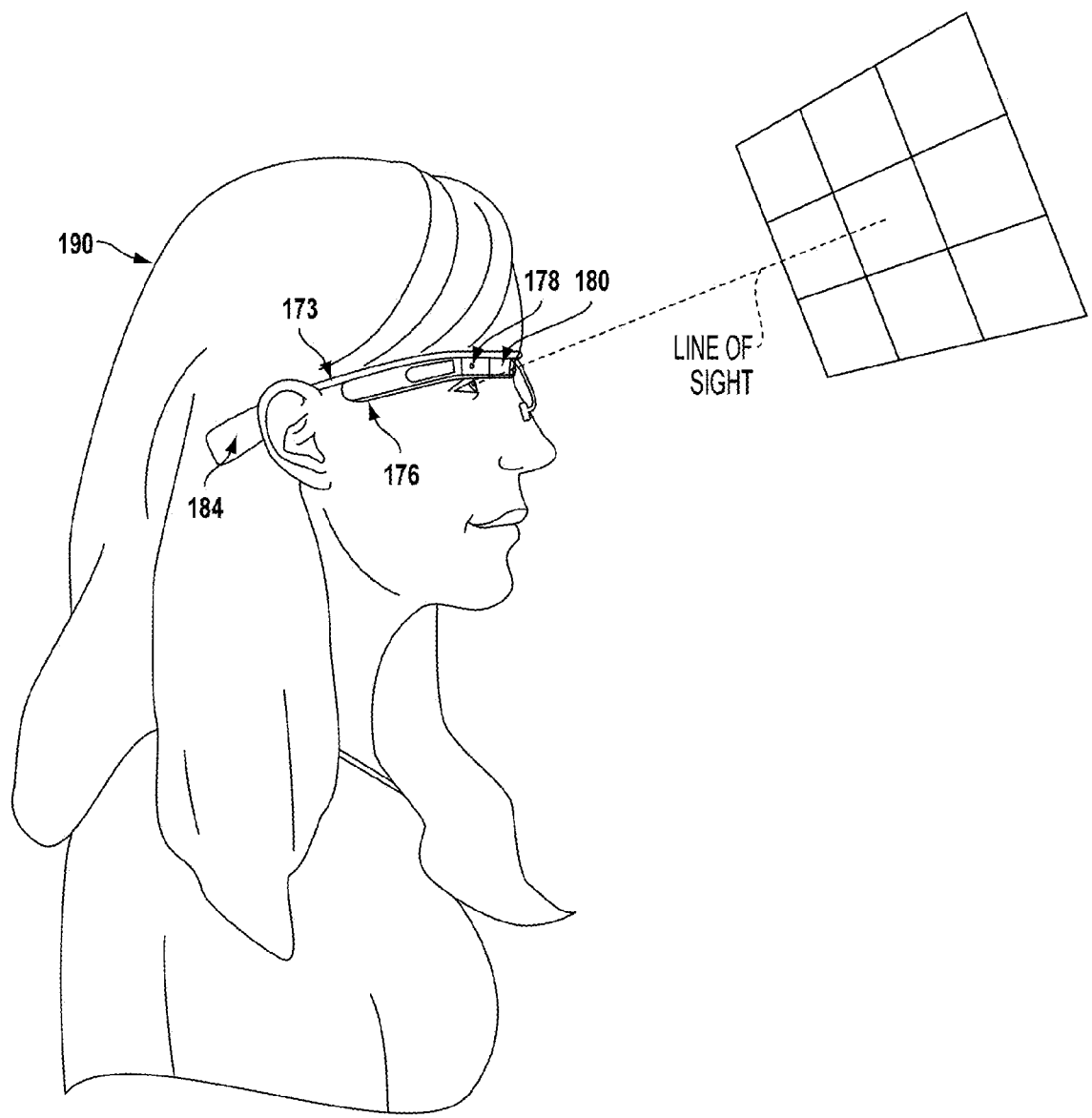

FIGS. 1E to 1G are simplified illustrations of the HMD 172 shown in FIG. 1D, being worn by a wearer 190. As shown in FIG. 1F, when HMD 172 is worn, BCT 184 is arranged such that when HMD 172 is worn, BCT 184 is located behind the wearer's ear. As such, BCT 184 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
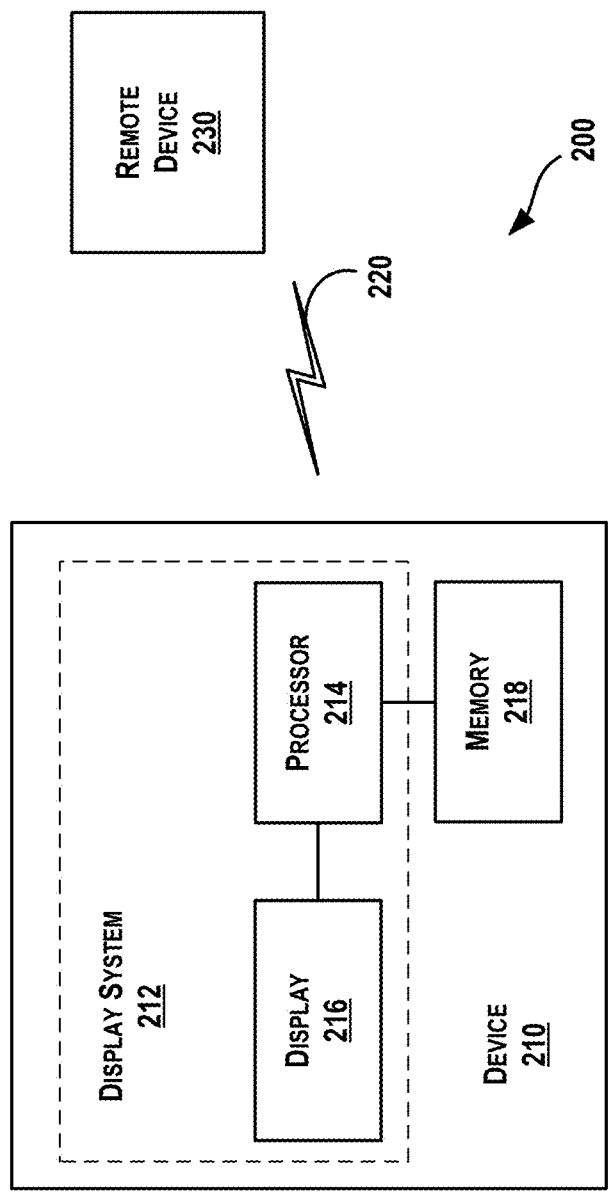
FIG. 2 is a simplified block diagram of a wearable computing device according to an example embodiment.

FIG. 2 is a simplified block diagram a wearable computing device 210 according to an example embodiment. In an example embodiment, wearable computing device 210 communicates using a communication link 220 (e.g., a wired or wireless connection) to a remote device 230. The wearable computing device 210 may be any type of device that can receive data and display information corresponding to or associated with the data. For example, the wearable computing device 210 may take the form of or include a head-mountable display, such as the head-mounted devices 102, 152, or 172 that are described with reference to FIGS. 1A to 1G.

The wearable computing device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The wearable computing device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the wearable computing device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as wearable computing device 210. Such a remote device 230 may receive data from another computing device (e.g., an HMD 102, 152, or 172 or a mobile phone), perform certain processing functions on behalf of the wearable computing 210, and then send the resulting data back to wearable computing 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 3A:
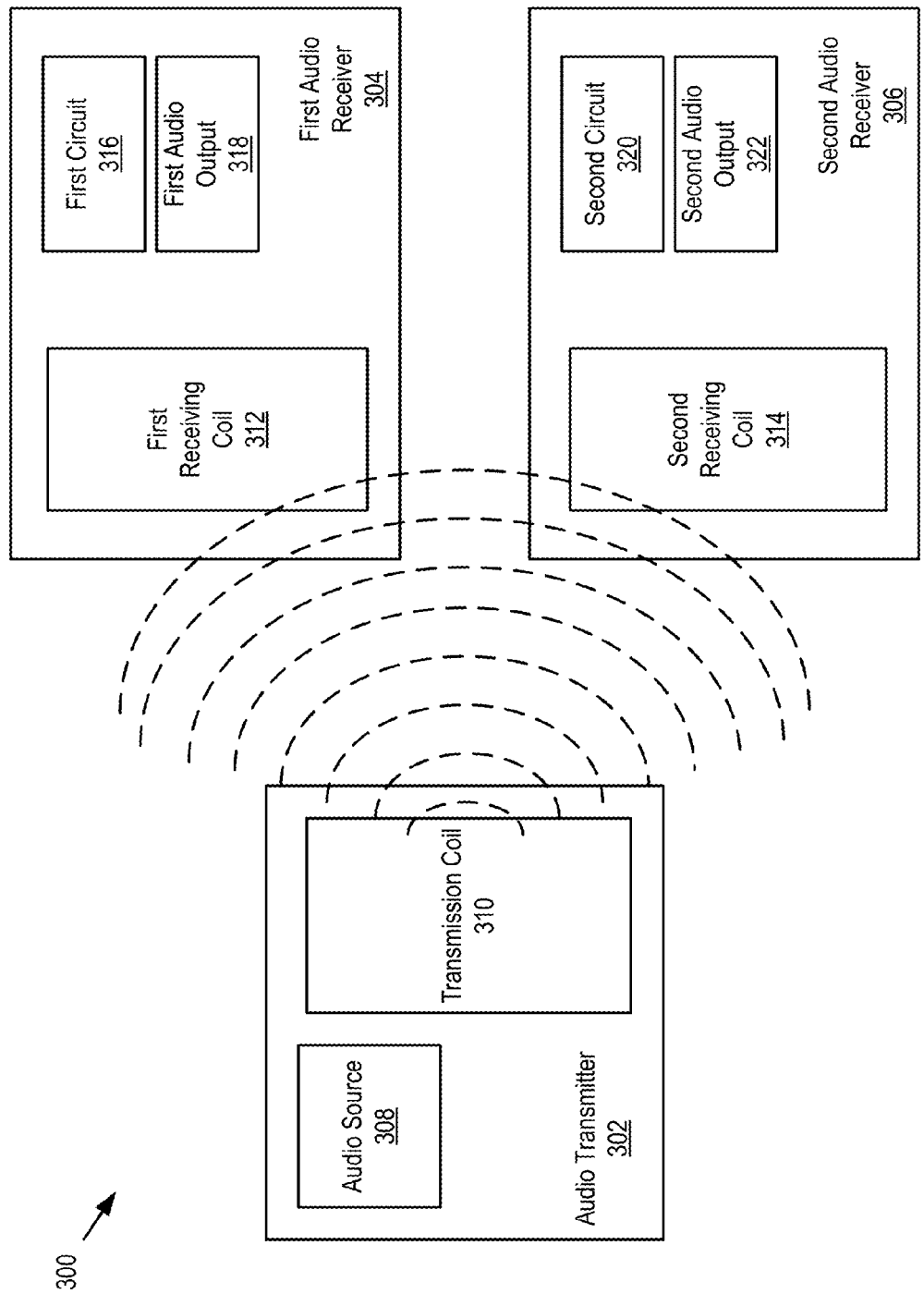

FIG. 3A is a simplified block diagram of a system 300 including an audio transmitter 302, a first audio receiver 304, and a second audio receiver 306, according to an example embodiment. In some embodiments, the audio transmitter 302 may take the form of a wearable computing device, such as any of the wearable computing devices 102, 152, 172, and 210 described above in connection with FIGS. 1A-G and 2. Alternatively, the audio transmitter 302 may be configured to be implemented in such a wearable computing device. The audio transmitter 302 may take other forms as well. In some embodiments, the first audio receiver 304 and/or the second audio receiver 306 may take the form of or may be implemented in an earbud or other headphone device. The first audio receiver 304 and/or the second audio receiver 306 may take other forms as well. Each of the first audio receiver 304 and the second audio receiver 306 may be coupled to the audio transmitter 302. For example, each of the first audio receiver 304 and the second audio receiver 306 may be wirelessly coupled to the audio transmitter 302.

As shown, the audio transmitter 302 includes an audio source 308 and a transmission coil 310. The audio source 308 may configured to generate an audio signal. The audio signal may include a first channel and a second channel. In some embodiments, the audio signal may be, for example, a high-fidelity audio signal, such as a stereo music signal. For example, the audio signal may be a signal indicating a musical song as embodied in, e.g., a .mp3 file. As another example, the audio signal may be a signal indicating an audio component of a video as embodied in, e.g., a. mp4 or .mov file. As yet another example, the audio signal may be a signal indicating speech in an incoming telephone call. As still another example, the audio signal may be a signal indicating an audio notification. Other audio signals are possible as well.

The audio source 308 may be configured to provide the audio signal to the transmission coil 310 for transmission to the first and second audio receivers 304, 306. To this end, the audio transmitter 302 may further include a circuit (e.g., an application-specific integrated circuit) that is configured to receive the audio signal from the audio source 308 and process the audio signal for transmission by the transmission coil 310. Alternatively, such a circuit may be included within the audio source 308. The audio source 308 may provide the audio signal to the transmission coil 310 in other manners as well.

The transmission coil 310 may be configured to transmit the audio signal using magnetic induction to the first and second audio receivers 304, 306. For example, the transmission coil 310 may be configured to transmit the audio signal at a frequency in a range of, e.g., 50-200 MHz. Other frequencies are possible as well. To this end, the transmission coil 310 may be formed of a magnetic core wound with conductive windings that are electrically isolated from one another. The conductive windings may be wound along a first axis. In some embodiments, the magnetic core may be formed of, for example, ferrite. Further, in some embodiments, the conductive windings may be formed of a magnetic wire formed from a conductive wire (e.g., copper or aluminum) coated with a thin insulating layer (e.g., polymer or fiberglass). The transmission coil 310 may be formed of other materials as well.

As shown, the first audio receiver 304 may include a first receiving coil 312. The first receiving coil 312 may be configured to receive the audio signal using magnetic induction from the transmission coil 310. To this end, the first receiving coil 312 may similarly be formed of a core wound with conductive windings that are electrically isolated from one another. The windings of the first receiving coil 312 may be wound along a second axis. The first receiving coil 312 may take any of the forms described above for the transmission coil 310.

Similarly, as shown, the second audio receiver 306 may include a second receiving coil 314. The second receiving coil 314 may be configured to receive the audio signal using magnetic induction from the transmission coil 310. To this end, the second receiving coil 314 may similarly be formed of a core wound with conductive windings that are electrically isolated from one another. The windings of the second receiving coil 314 may be wound along a third axis. The second receiving coil 314 may take any of the forms described above for the transmission coil 310.

The transmission coil 310 may be positioned near or adjacent to, but not in contact with, the first receiving coil 312 and the second receiving coil 314. As a result, the transmission coil 310 may be magnetically coupled to the first receiving coil 312 and the second receiving coil 314.

In some embodiments, the transmission coil 310 may less than about 20 cm from each of the first and second receiving coils 312, 314. To this end, for example, each of the first and second audio receivers 304, 306 may be configured to be positioned in, over, and/or adjacent to an ear of a user, and the transmission coil 310 may be positioned on a side-arm of a wearable computing device that includes the audio transmitter 302. Thus, when the wearable computing device and the first and second receiving coils 312, 314 are being worn by a user, the transmission coil 310 may be substantially adjacent to the audio receiver (e.g., the first audio receiver 304) that is positioned in the ear of the user that is on the same side of the user's head as the side-arm on which the audio transmitter 302 is positioned, and the transmission coil 310 may be near (but still within about 20 cm) of the audio receiver (e.g., the second audio receiver 306) that is positioned in the ear that is on the other side of the user's head. Other examples are possible as well.

Alternatively or additionally, in some embodiments the transmission coil 310, the first receiving coil 312, and the second receiving coil 314 may be positioned so that the windings of the transmission coil 310 are substantially parallel to the windings of the first receiving coil 312 and/or the windings of the second receiving coil 314. As noted above, the windings of the transmission coil 310 may be wound along a first axis, the windings of the first receiving coil 312 may be wound along a second axis, and the windings of the second receiving coil 314 may be wound along a third axis. Thus, to improve magnetic coupling between the transmission coil 310 and the first receiving coil 312, the transmission coil 310 may be positioned such that the first axis is substantially parallel to the second axis. Alternatively or additionally, to improve the magnetic coupling between the transmission coil 310 and the second receiving coil 314, the transmission coil 310 may be positioned such that the first axis is substantially parallel to the third axis. Other positions of the transmission coil 310, the first receiving coil 312, and the second receiving coil 314 are possible as well.

Once magnetically coupled to the first receiving coil 312 and the second receiving coil 314, the audio signal may be transmitted by the transmission coil 310 by passing a varying electrical current that indicates the audio signal through the windings of the transmission coil 310. As a result of the varying electrical current in the windings of the transmission coil 310, a varying magnetic flux will appear in the magnetic core of the transmission coil 310 and, in turn, in the cores of the first receiving coil 312 and the second receiving coil 314. The varying magnetic flux in the core of the first receiving coil 312 will induce a varying electric current in the windings of the first receiving coil 312. Similarly, the varying magnetic flux in the core of the second receiving coil 314 will induce a varying electric current in the windings of the second receiving coil 314. The varying electric currents in the windings of the first receiving coil 312 and the second receiving coil 314 may indicate the audio signal.

As shown, the first audio receiver 304 may further include a first circuit 316. The first circuit 316 may be configured to determine the audio signal based on the varying electric current in the windings of the first receiving coil 312. Further, the first circuit 316 may be configured to determine the first channel from the audio signal. To this end, the first circuit 316 may be configured to use data processing to isolate the first channel within the audio signal. The data processing used by the first circuit 316 may vary depending on audio processing used by the audio transmitter 302. For example, in embodiments where the audio transmitter 302 transmits the audio signal by modulating the frequencies of the first channel and the second channel in the audio signal (e.g., as in frequency modulation (FM) broadcasting), the first circuit 316 may demodulate the first channel. As another example, in embodiments where the audio transmitter 302 transmits the audio signal as an .mp3 stream, the first circuit 316 may include an .mp3 decoder configured to isolate the first channel. As still other examples, the audio transmitter 302 could encode the audio signal, and the first circuit 316 could decode the audio signal, using data packet transmission or time domain multiplexing. The first circuit may take other forms as well. Upon determining the first channel, the first circuit 316 may provide the first channel to the first audio output 318. The first audio output 318 may be configured to output the first channel. To this end, the first audio output 318 may take the form of a speaker. In some embodiments, the speaker may include its own speaker coil. In other embodiments, the speaker may use the first receiving coil 312 as a speaker coil to output the first channel.

The second audio receiver 306 may similarly include a second circuit 320. The second circuit 320 may be configured to determine the audio signal based on the varying electric current in the windings of the second receiving coil 314. Further, the second circuit 320 may be configured to determine the second channel from the audio signal. To this end, the second circuit 320 may be configured to use data processing to isolate the second channel within the audio signal. The data processing may take any of the forms described above in connection with the first circuit 316.

Upon determining the second channel, the second circuit 320 may provide the second channel to the second audio output 322. The second audio output 322 may be configured to output the second channel. To this end, the second audio output 322 may take the form of a speaker. In some embodiments, the speaker may include its own speaker coil. In other embodiments, the speaker may use the second receiving coil 314 as a speaker coil to output the second channel.

As noted above, in some embodiments the audio signal may be a high-fidelity signal, such as a stereo music signal. The first audio receiver 304 and the second audio receiver 306 may be configured to output the first and second channels, respectively, substantially simultaneously. As a result, a user of the system 300 may enjoy stereo output of the audio signal.

FIG. 3B is a simplified illustration of the audio transmitter 302 and the first audio receiver 304. While the second audio receiver 306 is not shown in FIG. 3B, it may take a form similar to that described for the first audio receiver 304.

As shown, the audio transmitter 302 may include the audio source 308, a magnet 324, and the transmission coil 310. The audio source 308 may be implemented in, for example, a printed circuit board and/or other electrical component. The magnet 324 may be, for example, a neodymium magnet. Other magnets are possible as well. The transmission coil 310 may be implemented with, for example, copper-clad aluminum wire. Other coils are possible as well.

The audio transmitter 302 may be implemented in a wearable computing device, as described above. To this end, the audio transmitter 302 may be manufactured with the wearable computing device, or the audio transmitter 302 may be manufactured separately from and be configurable with the wearable computing device. The audio transmitter 302 may take other forms as well.

Similarly, as shown, the first audio receiver 304 may include the first coil 312, a magnet 326, and the first circuit 316. The first coil 312 may similarly be implemented with, for example, copper-clad aluminum wire. Other coils are possible as well. The magnet 326 may be, for example, a neodymium magnet. Other magnets are possible as well. The first circuit 316 308 may be implemented in, for example, a printed circuit board and/or other electrical component.

In the embodiment shown in FIG. 3B, the first audio output 318 may use the first receiving coil 312 as a speaker coil to output the first channel. Alternatively, in other embodiments, the first audio receiver 304 may further include a speaker coil (not shown).

As shown, the first audio receiver 304 may be formed to be placed in, adjacent to, and/or over an ear of a user. To this end, in some embodiments the audio receiver 304 may further include a tip 328, such as a silicone tip, or other element to secure the first audio receiver 304 in, adjacent to, and/or over the ear.

In some embodiments, the first audio receiver 304 may be designed so that a single orientation of the first audio receiver 304 in, adjacent to, and/or over the ear is encouraged or required. In this manner, it may be possible during use of the first audio receiver 304 to substantially maintain the first audio receiver 304 in a position in which windings of the first receiving coil 312 are substantially parallel to windings of the transmission coil 310 in the audio transmitter 302, as shown. In particular, if windings of the transmission coil 310 are wound along a first axis, and windings of the first receiving coil 312 are wound along a second axis, the first audio receiver 304 may be designed so that, during use, the first axis remains substantially parallel to the second axis. Other orientations of the windings are possible as well.

While a particular shape of the first audio receiver 304 is shown, it will be understood that other shapes of the first audio receiver 304 are possible as well, including, for example, other in-the-ear shapes, an over-the-ear shape, an over-the-head shape, and/or an adjacent-to-the-ear headphone shape. Other shapes are possible as well.

FIGS. 4A-B show simplified illustrations of right-side (4A) and left-side (4B) views of an example wearable computing system, being worn by a user 400, according to an example embodiment. As shown in FIGS. 4A-B, the user 400 is wearing a wearable computing device 402. In some embodiments, the wearable computing device 402 may take the form of any of the wearable computing devices 102, 152, 172, and 210 described above in connection with FIGS. 1A-G and 2.

Further, as shown in FIG. 4A, the wearable computing device 402 may include or may be implemented with an audio transmitter 404. The audio transmitter 404 may take any of the forms described above for the audio transmitter 302 in connection with FIGS. 3A-B. In particular, the audio transmitter 404 may include a transmission coil (e.g., the transmission coil 310 described above in connection with FIGS. 3A-B) that is configured to transmit an audio signal using magnetic induction, as described above. The audio signal may include a first channel and a second channel. To this end, the audio transmitter 404 may include an audio source, such as the audio source 308 described above in connection with FIGS. 3A-B. Alternatively, the audio source may be implemented in the wearable computing device 402 and may be communicatively coupled to the transmission coil in the audio transmitter 404. The audio transmitter 404 may take other forms as well.

In some embodiments, the audio transmitter 404 may be positioned on a side-arm of the wearable computing device 402, as shown in FIG. 4A. In other embodiments, the audio transmitter 404 may be positioned elsewhere on the wearable computing device 402, such as on another frame element. Other positions of the audio transmitter 404 are possible as well.

As shown, the system further includes a first audio receiver 406. The first audio receiver 406 may take any of the forms described above for the first audio receiver 304 in connection with FIGS. 3A-B. In particular, the first audio receiver 406 may include a first receiving coil (e.g., the first receiving coil 312 described above in connection with FIGS. 3A-B) that is configured to receive the audio signal from the transmission coil using magnetic induction, as described above. Further, the first audio receiver 406 may include a first circuit (e.g., the first circuit 316 described above in connection with FIGS. 3A-B) configured to determine the first channel from the audio signal, and may include a first audio output (e.g., the first audio output 318 described above in connection with FIGS. 3A-B) configured to output the first channel. In some embodiments, the first audio output may output the first channel using the first receiving coil as a speaker coil, as described above.

The first audio receiver 406 may be configured to be positioned in, adjacent to, and/or over a first ear of the user 400. For example, as shown in FIG. 4A, in some embodiments the first audio receiver 406 may be configured as and/or implemented in an earbud that is configured to be positioned in the first ear of the user 400. As another example, in some embodiments the first audio receiver 406 may be configured as and/or implemented in a headphone that is configured to be positioned adjacent to and/or over the first ear of the user 400. The first audio receiver 406 may be configured in other manners as well.

In some embodiments, the first audio receiver 406 may be designed so that a single orientation of the first audio receiver 406 in, adjacent to, and/or over the first ear of the user 400 is encouraged or required. In this manner, it may be possible during use of the first audio receiver 406 to substantially maintain the first audio receiver 406 in a position in which windings of the first receiving coil in the first audio receiver 406 are substantially parallel to windings of the transmission coil in the audio transmitter 404. In particular, if windings of the transmission coil are wound along a first axis, and windings of the first receiving coil are wound along a second axis, the first audio receiver 406 may be designed so that, during use, the first axis remains substantially parallel to the second axis. Other orientations of the windings are possible as well.

In some embodiments, the audio transmitter 404 and the first audio receiver 406 may be positioned within about 20 cm of one another. For example, as shown, the audio transmitter 404 may be positioned on the side-arm of the wearable computing device 402 and the first audio receiver 406 may be positioned substantially adjacent to the audio transmitter 404 in the first ear of the user 400. Other positions of the first audio receiver 406 are possible as well.

As shown in FIG. 4B, the system further includes a second audio receiver 408. The second audio receiver 408 may take any of the forms described above for the second audio receiver 306 in connection with FIGS. 3A-B. In particular, the second audio receiver 408 may include a second receiving coil (e.g., the second receiving coil 314 described above in connection with FIGS. 3A-B) that is configured to receive the audio signal from the transmission coil using magnetic induction, as described above. Further, the second audio receiver 408 may include a second circuit (e.g., the second circuit 320 described above in connection with FIGS. 3A-B) configured to determine the second channel from the audio signal, and may include a second audio output (e.g., the second audio output 322 described above in connection with FIGS. 3A-B) configured to output the second channel. In some embodiments, the second audio output may output the second channel using the second receiving coil as a speaker coil, as described above.

The second audio receiver 408 may be configured to be positioned in, adjacent to, and/or over a second ear of the user 400. For example, as shown, in some embodiments the second audio receiver 408 may be configured as and/or implemented in an earbud that is configured to be positioned in the second ear of the user 400. As another example, in some embodiments the second audio receiver 408 may be configured as and/or implemented in a headphone that is configured to be positioned adjacent to and/or over the second ear of the user 400. The second audio receiver 408 may be configured in other manners as well.

In some embodiments, the second audio receiver 408 may be designed so that a single orientation of the second audio receiver 408 in, adjacent to, and/or over the second ear of the user 400 is encouraged or required. In this manner, it may be possible during use of the second audio receiver 408 to substantially maintain the second audio receiver 408 in a position in which windings of the second receiving coil in the second audio receiver 408 are substantially parallel to windings of the transmission coil in the audio transmitter 404. In particular, if windings of the transmission coil are wound along a first axis, and windings of the second receiving coil are wound along a third axis, the second audio receiver 408 may be designed so that, during use, the first axis remains substantially parallel to the third axis. Other orientations of the windings are possible as well.

In some embodiments, the audio transmitter 404 and the second audio receiver 408 may be positioned within about 20 cm of one another. For example, as shown, the audio transmitter 404 may be positioned on the side-arm of the wearable computing device 402 and the second audio receiver 408 may be positioned on the other side of the head of the user 400 in the second ear of the user 400. Other positions of the second audio receiver 408 are possible as well.

In some embodiments, the audio transmitter 404 may be configured to transmit the audio signal to the first audio receiver 406 and the second audio receiver 408 at a frequency between, for example, 50 and 200 MHz. Such a frequency may be substantially transparent to a human head. As a result, the audio transmitter 404 may use a reduced power level to transmit the audio signal as compared to, for example, an audio transmitter that operates in accordance with A2DP Bluetooth technology, which typically transmits an audio signal at a frequency of 2.4 GHz. In this manner, the audio transmitter 404 may exhibit an improved battery life.

Further, because audio signals transmitted using magnetic induction drop off quickly (i.e., at a rate of approximately $1/r^6$, where r is a distance from the transmission coil), the disclosed wearable computing system may be used in close proximity to other similar systems without interference. Moreover, the quick drop off of the audio signal may reduce a risk of the audio signal being intercepted. Nevertheless, in some embodiments, the audio signal may be encrypted by the audio transmitter 404 prior to transmission and may be decrypted by the first and second audio receivers 406, 408 upon reception.

While FIGS. 4A-B show the first and second audio receivers 406, 408 to be separate from one another, in some embodiments the first and second audio receivers 406, 408 may be included in a single structure, such as an over-the-head or behind-the-head structure. The first and second audio receivers 406, 408 may take other forms as well.

While FIGS. 4A-B show the audio transmitter 404 positioned on a side-arm of the wearable computing device 402 that is on a right side of the head of the user 400, it will be understood that, in other embodiments, the audio transmitter 404 may be positioned on a side-arm of the wearable computing device 402 that is on a left side of the head of the user 400, or in another position on the wearable computing device 402.

While the foregoing description focused on systems including a single audio transmitter and two audio receivers, in some embodiments a system may include a single audio transmitter and a single audio receiver (e.g., an audio transmitter and an audio receiver configured to be positioned on the same side of a user's head), or may include two audio transmitters and two audio receivers (e.g., one audio transmitter and one audio receiver configured to be positioned on each side of a user's head). In these embodiments, the audio transmitter(s) may be in close proximity to the audio receiver(s) (e.g., within about 5 cm). As such, other frequencies may be used to transmit the audio signal. For example, the audio signal may be transmitted at, e.g., 400 MHz. Other frequencies are possible as well. In any case, the frequency may be selected in light of the use of frequencies by other means of transmission (e.g., the cellular telephone and Bluteooth frequency ranges).

III. Conclusion

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A system comprising:
a wearable computing device comprising: (i) a component housing arranged such that the component housing is located on a first side of a head when the wearable computing device is worn, (ii) an audio source configured to generate an audio signal, wherein the audio signal comprises a first channel and a second channel, and (ii) a transmission coil arranged on or within the component housing and configured to transmit the audio signal using magnetic induction at a frequency in a range of 50 to 200 MHz, wherein the transmission frequency in the range of 50 to 200 MHz has a corresponding magnetic induction drop off that results in the audio signal having a transmission distance that is not significantly greater than 20 cm;
a first ear-wearable audio receiver comprising (i) a first receiving coil configured to receive the audio signal, (ii) a first circuit configured to process the audio signal to determine the first channel, and (iii) a first audio output configured to output the first channel using the first receiving coil; and
a second ear-wearable audio receiver comprising (i) a second receiving coil configured to receive the audio signal, (ii) a second circuit configured to process the audio signal to determine the second channel, and (iii) a second audio output configured to output the second channel using the second receiving coil;
wherein the arrangement of the transmission coil on or within the component housing is such that when (a) the component housing is located on the first side of the head, (b) the first ear-wearable audio receiver is worn in the first ear, and (c) the second ear-wearable audio receiver is worn in the second ear, the component housing is located about 20 cm or less from the second ear-wearable audio receiver, and is closer to the first ear-wearable audio receiver than to the second ear-wearable audio receiver.

2. The system of claim 1, wherein the audio signal comprises a signal indicating music.

3. The system of claim 1, wherein:
the transmission coil comprises a plurality of windings wound along a first axis;
the first receiving coil comprises a plurality of windings wound along a second axis;
the second receiving coil comprises a plurality of windings wound along a third axis; and
the transmission coil is configured to be positioned such that the first axis is substantially parallel to at least one of the second axis and the third axis.

4. The system of claim 1, wherein the first ear-wearable audio receiver comprises a first earbud and the second ear-wearable audio receiver comprises a second earbud;
wherein the first earbud includes the first audio receiver; and
wherein the second earbud includes the second audio receiver.

5. The system of claim 4, wherein:
the first earbud is wirelessly coupled to the wearable computing device; and
the second earbud is wirelessly coupled to the wearable computing device.

6. A system comprising:
a transmission coil configured to transmit an audio signal, wherein the audio signal comprises a first channel and a second channel, wherein the transmission coil is disposed in a component housing of a wearable computing device, wherein the component housing is arranged such that the component housing is located on a first side of a head when the wearable computing device is worn, wherein the component housing is configured to transmit the audio signal using magnetic induction at a frequency in a range of 50 to 200 MHz, wherein the transmission frequency in the range of 50 to 200 MHz has a corresponding magnetic induction drop off that results in the audio signal having a transmission distance that is not significantly greater than 20 cm;

a first ear-wearable audio receiver comprising (i) a first receiving coil configured to receive the audio signal, (ii) a first circuit configured to process the audio signal to determine the first channel, and (iii) a first audio output configured to output the first channel using the first receiving coil; and a second ear-wearable audio receiver comprising (i) a second receiving coil configured to receive the audio signal, (ii) a second circuit configured to process the audio signal to determine the second channel, and (iii) a second audio output configured to output the second channel using the second receiving coil;

wherein the arrangement of the transmission coil on or within the component housing is such that when (a) the component housing is located on the first side of the head, (b) the first ear-wearable audio receiver is worn in the first ear, and (c) the second ear-wearable audio receiver is worn in the second ear, the component housing is located about 20 cm or less from the second ear-wearable audio receiver, and is closer to the first ear-wearable audio receiver than to the second ear-wearable audio receiver.

7. The system of claim 6, further comprising an audio transmitter that includes the transmission coil, wherein the audio transmitter comprises an audio source configured to generate the audio signal.

8. The system of claim 6, wherein:
the transmission coil comprises a plurality of windings wound along a first axis;
the first receiving coil comprises a plurality of windings wound along a second axis;
the second receiving coil comprises a plurality of windings wound along a third axis; and
the transmission coil is configured to be positioned such that the first axis is substantially parallel to at least one of the second axis and the third axis.

9. The system of claim 6, wherein the audio signal comprises a signal indicating music.

* * * * *